United States Patent Office 3,036,989
Patented May 29, 1962

3,036,989
PROCESS FOR THE PRODUCTION OF LINEAR CO-POLYESTERS OF CARBONIC ACID
Wolfgang Griehl and Hans Lückert, Chur, Graubunden, Switzerland, assignors to Inventa, A.G. für Forschung und Patentverwertung, Zurich, Switzerland
No Drawing. Filed Mar. 6, 1959, Ser. No. 797,589
Claims priority, application Switzerland Mar. 8, 1958
5 Claims. (Cl. 260—47)

The invention relates to a process for the manufacture of high-molecular linear co-polyesters of carbonic acid and, more particularly, to the use of diesters of aliphatic or cycloaliphatic diols with aromatic oxyacids for the purpose.

The useful employment of products derived from lignin, such as vanillin and vanillic acid, has been the subject of much investigation for reasons of economy. Investigations have been conducted into the production of polyesters from vanillin derivatives. Especially, the polyester of vanillic acid-($\beta$-oxyethyl)-ether has attained a certain significance. However, as is shown in U.S. Patent 2,686,198, usable products of sufficiently high molecular weight by polycondensation of free oxyacids require, even with the use of catalysts, a condensation period of 27.5 hours. This, of necessity, always leads to discolored polyesters due to the high condensation temperatures. Even if the polycondensation is effected by an ester interchange, a considerably faster method, using, for instance, methyl esters as starting products, the condensation periods still are unduly long. The principal drawback of such a method, however, resides in the fact that due to incomplete reaction it is practically impossible to attain sufficiently high molecular weights to employ the end products as plastics. In general, polyesters made in the manner as described have low softening and melting points. For that reason, polyesters of the afore-mentioned vanillic acid- ($\beta$-oxyethyl)-ether or of 1.2-bis(-2-methoxy-4-carboxy-phenoxy)ethane cannot be used for the manufacture of textiles having an ironing resistance as do nylon or Terylene (a terephthalic acid-glycol ester).

It now has been found that high-molecular, high-melting polyesters can be produced which do not display the abovementioned drawbacks by converting diesters of aliphatic or cyclo-aliphatic diols and aromatic oxyacids into the corresponding co-polyesters of carbonic acid. Aside from vanillic acid, unsubstituted p-oxybenzoic acid, and p-oxybenzoic acids substituted in o- or m-position to the carboxyl groups whose substituents are not capable of reacting during the polycondensation, may be used. Valuable polyesters are obtained, e.g., with 4-oxy-3-chlorobenzoic acid, 4-oxy-3-methylbenzoic acid and 4-oxy-3.5-dimethoxybenzoic acid.

Among others, the following aliphatic or cycloaliphatic diols can be used according to the present invention: ethylene glycol, diethylene glycol, triethylene glycol, polyethylene glycol, thiodiglycol, propanediol-1.2, propanediol-1.3, butanediol-1.3, butanediol-1.4, pentanediol-1.5, hexanediol-1.6, 2-ethylpropanediol-1.3, quinitol and p-xylenediol.

The aromatic 4.4-dioxydiesters obtained by esterification of a diol with a p-oxybenzoic acid advantageously are converted into high-molecular co-polyesters of carbonic acid by reaction with phosgene. When phosgene is introduced in the aqueous solution of the alkali salts of the dioxyesters, if desired in the presence of an inert solvent which dissolves phosgene, the polymer is formed in solid and grainy form. If, however, the phosgene is introduced in solutions of the dioxyesters in organic bases, particularly pyridine, or in solution in inert organic solvents, e.g., CHCl$_3$, with addition of an organic base which splits off HCl, the high-molecular co-polyester is obtained as a solution. It also is possible to convert the dioxyesters into high-molecular plastics as bischlorocarbonic acid esters either with equimolar amounts of dioxyesters with the addition of an acid-binding agent, e.g., pyridine, or with equimolar amounts of the alkali salts of the dioxyesters.

The co-polyesters of carbonic acid produced in the manner described above and from the diesters named have excellent physical, chemical and mechanical properties. Due to considerably shorter reaction times and lower temperatures as compared with the initially mentioned polyesters of vanillin derivatives, substantially colorless condensates are obtained which have molecular weights of any desired height. The molecular weight can be selected very accurately by addition of the corresponding quantities of monofunctional compounds. With polyesters as produced heretofore, i.e., in a melt, this has met with considerable difficulties. The physical properties, such as softening and melting points, of the co-polyesters according to the present invention depend strongly upon the acid component and upon the diol used. Fabrication into shaped bodies, fibers, filaments, film, foil and sheets can be accomplished from the solution or in the plastic state of the resin.

The invention now will be more fully explained by means of the following examples. However, it should be understood that these are given merely by way of illustration, not of limitation, and that numerous changes may be made in the details without departing from the spirit and the scope of the invention as hereinafter claimed.

*Example 1*

30 parts by weight ethyleneglycoldivanillate are dissolved in 165.8 parts by volume normal KOH at room temperature. 20 parts by volume toluene are added, and the mixture is agitated mechanically and cooled to 25° C. At that temperature and under continued agitation, 8.5 parts by weight phosgene are conducted into the clear solution. Thereafter, the reaction mixture is agitated at 70° C. for one hour on a waterbath. The product which thereby has separated is entirely colorless. It is filtered off and washed well with water. The product thus obtained is a high-melting co-polyester of carbonic acid having a molecular weight of 30,000 and is soluble in a number of organic solvents, e.g., cresol, phenol, chlorophenol and chloroform.

*Example 2*

30.2 parts by weight ethylene glycol-bis-(4.4-dioxy)-benzoate are dissolved in 35 parts by weight absolute pyridine. The temperature is adjusted to 0° C., and mechanical agitation is provided. 196 parts by weight of a 5.2% solution of phosgene in chloroform are added dropwise within 2 hours. After dilution of the solution with 150 parts by volume chloroform, it is shaken several times with dilute hydrochloric acid and water. The solution then is dried with sodium sulfate, and the solvent is distilled off on a waterbath. The residue is a hard, colorless synthetic resin having a molecular weight of 20,000.

We claim as our invention:
1. A process for the production of linear polycarbonate polyesters from aromatic 4.4-dioxydiesters, prepared by the reaction of diols with oxycarboxylic acids selected from the group consisting of vanillic acid, p-hydroxybenzoic acid, 4-oxy-3-chlorobenzoic acid, 4-oxy-3-methylbenzoic acid and 4-oxy-3,5-dimethoxybenzoic acid, which comprises dissolving said dioxydiesters in an alkaline medium and introducing phosgene therein, substantially in proportions of 30 parts by weight dioxydiester to 8.5-

10 parts by weight phosgene, separating the polyesters thus obtained and drying the same.

2. The process as claimed in claim 1, wherein the introduction of phosgene is carried out substantially at room temperature.

3. The process as claimed in claim 2, wherein the temperature, after termination of the phosgene introduction, is raised to approximately 70° C. and maintained at that temperature for approximately one hour.

4. The process as claimed in claim 1, wherein said alkaline medium is provided by dissolving said diester in pyridine.

5. The process as claimed in claim 1, wherein said diester is present as its potassium salt in solution.

References Cited in the file of this patent

UNITED STATES PATENTS 2,799,665     Lincoln  ---------------- July 16, 1957